No. 629,938. Patented Aug. 1, 1899.
E. TYDEN.
SELF LOCKING SEAL.
(Application filed Apr. 4, 1898.)
(No Model.)
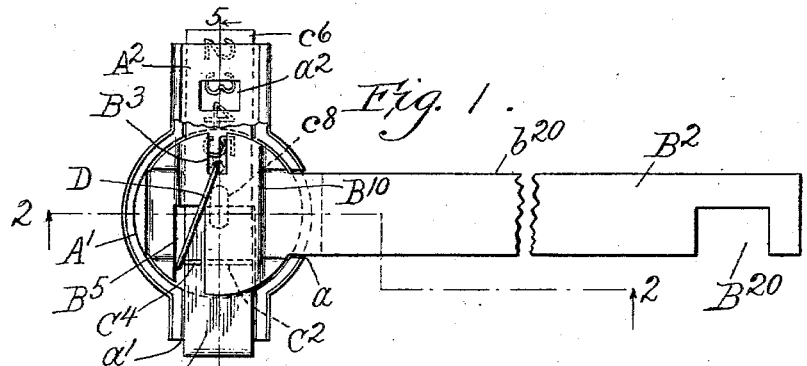
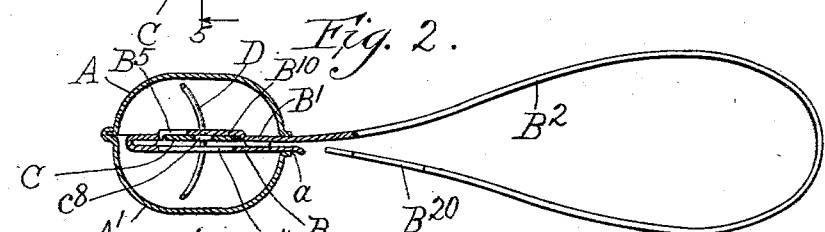
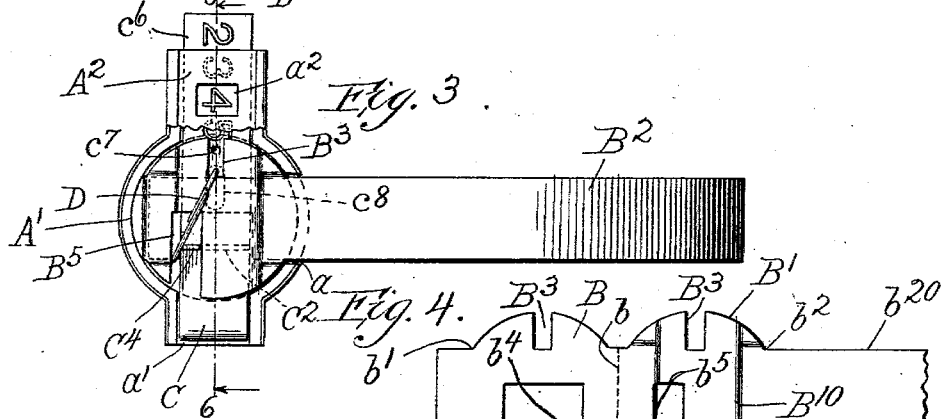
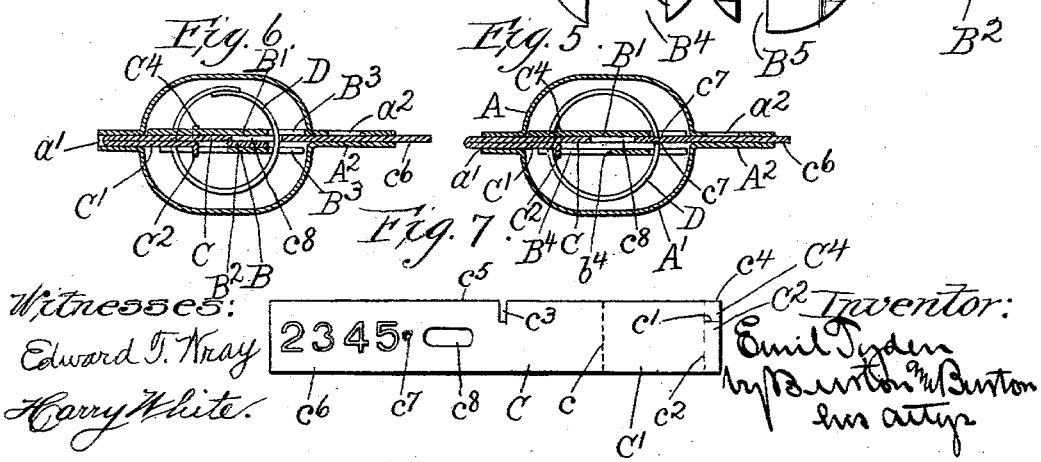
Witnesses:
Edward T. Kray
Harry White.
Inventor:
Emil Tyden
by Burton & Burton
his attys

UNITED STATES PATENT OFFICE.

EMIL TYDEN, OF CHICAGO, ILLINOIS, ASSIGNOR TO THE INTERNATIONAL SEAL AND LOCK COMPANY, OF HASTINGS, MICHIGAN.

SELF-LOCKING SEAL.

SPECIFICATION forming part of Letters Patent No. 629,938, dated August 1, 1899.

Application filed April 4, 1898. Serial No. 676,437. (No model.)

*To all whom it may concern:*

Be it known that I, EMIL TYDEN, a citizen of the United States, residing at Chicago, county of Cook, and State of Illinois, have invented certain new and useful Improvements in Self-Locking Seals, which are fully set forth in the following specification, reference being had to the accompanying drawings, forming a part thereof.

In the drawings, Figure 1 is a plan or face elevation of my improved self-locking seal with one cap of the body removed, the parts being shown in unlocked position. Fig. 2 is a section at the line 2 2, the cap being shown in place. Fig. 3 is a plan similar to Fig. 1, showing the parts in locked position. Fig. 4 is a plan of the sheath for the securing device in blank—that is, unfolded. Fig. 5 is a section at the line 5 5 on Fig. 1. Fig. 6 is a section at the line 6 6 on Fig. 3. Fig. 7 is a plan of the blank from which the keeper is formed by folding.

In my improved self-locking seal the securing device is preferably a strap or band of flexible material, as sheet metal, adapted to be looped through the staple or hasp or other fastening which is to be sealed, the end being then inserted in the seal-body and engaged therein by devices provided for that purpose, which comprise a keeper or locking-bolt adapted to be thrust into the case transversely to the securing device and to engage the latter after it is in place and a catch which automatically engages this keeper after it is thus thrust into locking position. The seal body or case comprises two parts A and A' of the shell, in which is lodged a sheath or guiding-seat for the securing device and which when the securing device is the looped strap above referred to is conveniently and preferably in one piece of metal with said securing device. This sheath comprises the wings B B' in one piece folded at the line $b$, (see Fig. 4,) the ends of both wings emerging from the case through an aperture $a$ and one end being produced to constitute the securing device or strap $B^2$, which is adapted to be inserted back into the case between the two leaves B and B'. The two parts B and B' are enlarged by extension edgewise, commencing at the points $b'$ $b^2$, where they emerge from the aperture $a$ and fit said aperture, these edgewise enlargements serving to retain both leaves of the sheath within the case and unite the securing device or strap $B^2$ in a positive way to the case. In the leaf B' of the sheath there is formed a transverse guideway $B^{10}$ for the keeper C, and in line with this guideway at one side the case has an aperture $a'$ and at the other side a pocket extension which constitutes a continuation of the guideway for the keeper, being adapted to receive the inner end of the latter. The keeper is formed of a piece of sheet metal folded upon itself at $c$, having been first cut through at the right angle indicated by the line $c'$ and folded at right angles to the plane of its surface at the dotted line $c^2$, whereby a transverse lip $C^2$ and tooth $C^4$ are formed, which latter projects through a notch $c^3$ in one edge of the keeper when the fold at the dotted line $c$ is made, so that the edge $c^4$ stands in the plane of the edge $c^5$, at right angles thereto, when the folding is completed. In one edge of the securing device or strap $B^2$, near the end, there is formed a rectangular notch $B^{20}$, whose width is equal to the width of the keeper C. The keeper C is lodged in the seat B', with its end $c^6$ entered in the pocket $a^2$ of the case, while its outer end, which is double thickness from the fold-line $c$ inward to the lip $C^2$, extends out through the aperture $a'$ of the case and constitutes a stem or handle for the keeper, by which it may be manipulated to thrust it inward. The space between the two leaves B and B' of the sheath is sufficient to accommodate, in addition to the thickness of the keeper C, the thickness of the securing device or strap $B^2$, and when the latter is thrust into the sheath to the bottom the notch $B^{20}$ stands in line with the keeper and in the plane of the fold C' of the keeper, so that when the latter is thrust inward after the securing device is thus also thrust in to the bottom of the sheath the shoulder of the keeper, formed at the end of the unfolded portion C', enters the notch $B^{20}$ and retains the securing device in the case. The lip $C^2$, standing across the plane of the securing device and having the edge of its tooth $C^4$ across the edge of the notch $B^{20}$, makes the engagement of the keeper with the securing device secure notwithstanding both parts are of thin metal, and the tooth thus formed is very desirable, because otherwise the two metal pieces, which but for the tooth would be engaged edge to edge, might miss engagement, and the edge of the securing device slipping by the edge of the keeper might fail to be reliably retained.

D is the catch, which engages the keeper when the latter is thrust into locking position. It is a spring-wire ring coiled with its ends lapping, but adapted to be spread to open it, and by construction it is lodged in the case with its ends spread and grasping between them the keeper, which may have slight indentations at $c^7$, in which the spread ends of the catch are lodged. The two leaves of the sheath have notches $B^3 B^3$, coinciding when the sheath is folded together, and through these notches the ends of the catch extend to grasp the keeper, which is seated in the seat $B'$ of the sheath. Notches $B^3$ extend in substantially to but in any event not beyond the line of the path of the edge of the securing device opposite the edge which has the notch $B^{20}$, and the diameter of the ring is somewhat greater than the width of the securing device, so that when the ends are lodged at the bottom of the notches $B^3$ the opposite side, passing by the lower edge of the keeper, may also pass outside the path of the notched edge of the securing device, and in order to permit it to lodge in this position the leaves of the sheath have at that side the notches $B^4$ and $B^5$, whose lower or inner edges $b^4$ or $b^5$ coincide, being beyond the proximate lateral edge of the keeper a distance equal to or a trifle greater than the diameter of the wire of which the catch D is made, so that when the parts are assembled as shown in Fig. 1 these edges constitute a ledge, or support, or guide-bearing for the side of the ring D, on which it rests, as seen in Fig. 1. The notch $B^4$ in the leaf B of the sheath is wide enough to admit the lip or flange $C^2$ of the keeper, but the notch $B^5$ need be and is only wide enough to admit the tooth $C^4$. The depth of these notches is such that their bottom line coincides with the bottom line of the notch $B^{20}$ when the securing device is inserted in locking position. The securing device has an aperture $c^8$, which at unlocked position is covered between the two leaves of the sheath about midway in the path of the securing device, and the depth of the pocket $A^2$ is sufficient to permit the keeper to be thrust inward far enough to bring the aperture $c^8$ past the line of the edge $b^2$ of the securing device when the latter is in locking position. The operation of this device is that the parts being in its construction assembled as shown in Fig. 1, the keeper being withdrawn, and the catch being spread so that its ends, extending through the notches $B^3 B^3$, grasp the keeper at the points $c^7 c^7$, there is an open path in the sheath to the bottom thereof for the end of the securing device. The latter being thrust into the sheath passes through the ring-catch D, and thereby stops the side of the ring, which is lodged on the edges $b^4 b^5$ of the notches $B^4 B^5$, against inward movement along said edges. If now the keeper be thrust inward, the ends of the spring-catch will drag along its surface, the catch itself being prevented from moving bodily by reason of its opposite side being stopped against the edge of the securing device until the aperture $c^8$ reaches the edge of the catch, whereupon the catch will close up, thrusting its ends through said aperture and preventing the withdrawal of the keeper, which in this inward movement has protruded the shoulder formed by the inner end of the fold C' into the notch $B^{20}$, thereby retaining the securing device. It will be noticed that if in handling these devices the keeper is accidentally thrust inward no effect is produced and the lock is not sprung, because the catch D, grasping the keeper between its spread ends, will be carried bodily by the keeper, its opposite side riding on the lower edges of the notches $B^4 B^5$, and that only after the securing device is inserted in the sheath so far that it presents an edge inside the ring at the side opposite the spread ends, and thereby prevents the bodily movement of the ring with the keeper, can such movement have any effect to spring the lock. Furthermore, it will be noticed that if the securing device is only partly inserted in the sheath, even though it be so far inserted as to present an edge to the ring to arrest the bodily movement of the latter with the keeper, yet unless it is fully inserted, so that its notch $B^{20}$ is directly in the path of the shoulder of the keeper, the inward movement of the keeper itself is rendered impossible for lack of an open path for the shoulder. Thus it is made certain that either the lock will not be sprung by any manipulation of the parts or else it will by being sprung cause the keeper to engage and lock the securing device. The essential or most fundamental characteristic involved in this peculiarity of the action of the device is that the springing of the catch is dependent upon two movements—one a movement of the securing device to locking position and the other a movement of the keeper to locking position—and that neither movement alone will effect the result, and also that the completion of both movements is necessary to the result. This characteristic may be involved in a variety of structures, and while I regard the specific devices herein shown as having special merit for the purpose of this characteristic and shall claim them specifically for that purpose I do not limit myself to these devices.

In order to insure the inspection of this lock by all persons charged with that duty, a serial number or other identifying series of characters which must be read and reported by the inspector are imprinted on the keeper, and the notches $B^4 B^5$ are made of a depth in excess of that which might be sufficient for the safe engagement of the keeper equal to the space assigned to each character or figure of the serial number or other mark, and the aperture $c^8$ is correspondingly elongated, so that the keeper may have a certain limited range of movement within its locked and locking position, and the characters are so placed on the keeper that at all positions within such range of movement one or more of them necessary to be seen in order to properly read and report the seal shall be concealed by the case. This is most conveniently effected by extending the case at the side toward which the keeper is thrust in locking it, forming a throat or neck $A^2$, open at the end, so that the keeper when thrust therethrough may protrude, and forming in one face of this neck an aperture $a^2$, located back from the open end far enough so that the intervening metal is sufficient to cover and conceal one figure of the serial number, the aperture being of suitable size to disclose one figure. If now the seal have, for example, one character, as character "4" in the drawings, in position to appear at the aperture $a^2$ when the catch-ring snaps into the aperture $c^8$ and another character, as "5," farther back on the keeper, so that in order that it may appear through the aperture $a^2$ the keeper must be thrust or drawn through as far as the length of the slot $c^3$ will permit, it will be seen that either character "4" will be concealed in the neck of the case between the aperture $a^2$ and the outer end of said neck or the character "5" will be concealed under the case inward from the aperture, and in whatever position the keeper may chance to stand when the inspection is made it must be moved to the other position in order to read both characters. If it is desired to add further characters, a third character may be placed on the opposite side of character "4" from that occupied by character "5," so that the movement which discloses character "5" through the aperture will disclose such additional character, as "3," beyond the end of the neck, and it is obvious also that still other character or characters may be added in position to be read beyond the neck when the character "4" is read through the aperture. Thus character "2" is so placed, and of the entire number "2,345" only characters "2" and "4" can be read when the keeper is in the position shown in Fig. 3, and only "2," "3," and "5" can be read when the keeper is thrust through to the full limit permitted by the slot $c^8$.

I claim—

1. In a self-locking seal, in combination with a case, a securing device adapted to be advanced within the case; a keeper adapted to engage and retain the securing device, and a catch which is, by the construction of the device, held under tension ready to react into engagement with the keeper and adapted to be tripped into engagement therewith by the movement of the latter to locking position.

2. In a self-locking seal, in combination with the case, a securing device adapted to be advanced within the case to locking position; a keeper lodged within the case and adapted to be advanced transversely to the movement of the securing device to engage the same, and a catch which is, by the construction of the device, held under tension ready to react into engagement with the keeper and adapted to be tripped into engagement therewith by the coöperation of the movements of the securing device and keeper to their locked and locking positions respectively.

3. In a self-locking seal, in combination with the case, a sheath or guide for the securing device lodged and retained permanently within the case, and the securing device adapted to be inserted into such sheath; a keeper seated and adapted to be moved in the sheath transversely to the movement therein of the securing device, the securing device having a lateral notch, and the keeper having a shoulder or abutment adapted to engage said notch; and a spring-catch which is engaged by the sheath and is adapted to engage the keeper when the latter is at locking position, whereby retreat from such locking position is prevented.

4. In a self-locking seal, in combination with the case, the sheath therein having an entering throat for the securing device, and a transverse seat $B'$; the keeper lodged in such transverse seat; the securing device having the notch $B^{20}$, and the keeper having a shoulder or abutment adapted to engage said notch; the catch D having its ends spread and entered through the opposite walls of the sheath, and by the construction of the device grasping the keeper; the sheath having the notches whose edges $b^4 b^5$ constitute a ledge or shoulder for the side of the catch opposite said ends in position adapted to hold said side out of the path of the securing device, whereby the latter may be entered through the ring without encountering the same; the keeper having the aperture $c^8$ in position to receive the ends of the catch when the shoulder of the keeper is engaged with the notch of the securing device.

5. In a self-locking seal, in combination with the case, the sheath having a throat for the securing device, and a seat transverse thereto, the keeper sliding in such seat to engage the securing device; the sheath having the notches $B^3$ at one side and the notches $B^4 B^5$ at the opposite side, the spring-catch D encompassing the sheath and the path of the securing device therein and lodged at one side in the notches $B^4 B^5$, and having its ends entering the notches $B^3$ at the other side and grasping the keeper between them, the latter having the aperture $c^8$ adapted to receive the ends when the keeper is in locking position; whereby the spring-catch is adapted to move bodily with the catch, except when restrained by the securing device extending through it, and when thus restrained, drags its ends on the keeper to the aperture $c^8$, and engages the latter.

6. In a self-locking seal, the combination with the case, the securing device, a keeper to engage the securing device and a catch to engage the keeper, the latter having a limited range of movement with respect to the case within its locked and locking position, relatively movable parts bearing a serial number of which a legible portion is concealed by the movement of the keeper toward one limit of its range of movement and disclosed by the keeper's movement toward the other limit.

7. In a self-locking seal, the combination with the case, a securing device, a keeper to engage the securing device and a catch to engage the keeper, the latter having a limited range of movement within its locked and locking position, relatively movable parts bearing a serial number of which one legible portion is concealed and another legible portion is disclosed by the movement of the keeper toward one limit, the first portion being disclosed and the second portion concealed by the keeper's movement toward the other limit.

8. In a self-locking seal, in combination with the case, the securing device; a keeper to engage the securing device and a catch to engage the keeper, the keeper having a limited range of movement with respect to the case within its locked position, and bearing a serial number or other arbitrary succession of characters, a legible portion of which is concealed by the case at one position and disclosed at another position within the limits of such range of movement.

9. In a self-locking seal, in combination with the case, the securing device; a keeper to engage the securing device and a catch to engage the keeper; the keeper having a limited range of movement within its locking position and bearing a serial number or other arbitrary succession of characters, one legible portion of which is concealed and another legible portion disclosed at one position within the limits of such range of movement, the first portion being disclosed and the second portion concealed at another position within such limit.

In testimony whereof I have hereunto set my hand, in the presence of two witnesses, at Chicago, Illinois, this 26th day of March, 1898.

EMIL TYDEN.

Witnesses:
 CHAS. S. BURTON,
 JEAN ELLIOTT.